(12) United States Patent  (10) Patent No.: US 8,737,008 B1
Watanabe et al.  (45) Date of Patent: May 27, 2014

(54) DISK DRIVE ADJUSTING GAIN OF SPINDLE MOTOR COMPENSATOR BASED ON A RATIO OF SPIN SPEEDS

(75) Inventors: Taylor Watanabe, Irvine, CA (US); Wenli Yang, Irvine, CA (US); Ashok K. Desai, Westlake Village, CA (US); William T. Stoll, Chino Hills, CA (US); Angel Yu, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 316 days.

(21) Appl. No.: 13/106,710

(22) Filed: May 12, 2011

(51) Int. Cl.
*G11B 15/46* (2006.01)

(52) U.S. Cl.
USPC ................................................. 360/73.03

(58) Field of Classification Search
USPC ........ 360/71, 73.01–73.14; 369/47.38–47.48, 369/53.3
See application file for complete search history.

(56) References Cited

U.S. PATENT DOCUMENTS

| | | | |
|---|---|---|---|
| 5,170,386 A | 12/1992 | Tateishi | |
| 5,404,255 A | 4/1995 | Kobayashi et al. | |
| 5,432,766 A | 7/1995 | Ando et al. | |
| 5,471,353 A | 11/1995 | Codilian et al. | |
| 5,898,283 A | 4/1999 | Bennett | |
| 6,574,062 B1 | 6/2003 | Bennett et al. | |
| 6,753,667 B2 | 6/2004 | Sakamoto | |
| 6,825,622 B1 | 11/2004 | Ryan et al. | |
| 6,914,740 B1 | 7/2005 | Tu et al. | |
| 6,954,324 B1 | 10/2005 | Tu et al. | |
| 6,965,547 B2 | 11/2005 | Kadlec et al. | |
| 6,972,540 B1 | 12/2005 | Wang et al. | |
| 7,265,936 B1 | 9/2007 | Lee et al. | |
| 7,289,288 B1 | 10/2007 | Tu | |
| 7,443,628 B2 | 10/2008 | Oyabu | |
| 7,471,483 B1 | 12/2008 | Ferris et al. | |
| 7,602,129 B2 | 10/2009 | Shirai et al. | |
| 2002/0110057 A1 | 8/2002 | Kadlec et al. | |
| 2004/0013056 A1* | 1/2004 | Ando | 369/44.29 |
| 2004/0125494 A1 | 7/2004 | Hara et al. | |
| 2004/0160865 A1 | 8/2004 | Storz | |
| 2004/0190397 A1 | 9/2004 | Kuwahara et al. | |
| 2004/0246618 A1 | 12/2004 | Ehrlich | |
| 2004/0246833 A1 | 12/2004 | Ehrlich | |
| 2008/0042602 A1* | 2/2008 | Kumar | 318/66 |
| 2010/0195243 A1 | 8/2010 | Zhu et al. | |
| 2011/0235206 A1 | 9/2011 | Chung | |

\* cited by examiner

*Primary Examiner* — Nathan Danielsen

(57) ABSTRACT

A disk drive is disclosed comprising a head actuated over a disk, a spindle motor for rotating the disk, and a spindle motor control system comprising a servo compensator operable to generate a control signal applied to the spindle motor, the servo compensator comprising a programmable gain term (PGT). The disk is spun at a first speed RPM_1 using a first value PGT_1 selected for the PGT, and the disk is spun at a second speed RPM_2 using a second value PGT_2 selected for the PGT, wherein the second value PGT_2 is generated in response to the first value PGT_1 scaled by a function of a ratio of RPM_2 to RPM_1.

24 Claims, 4 Drawing Sheets

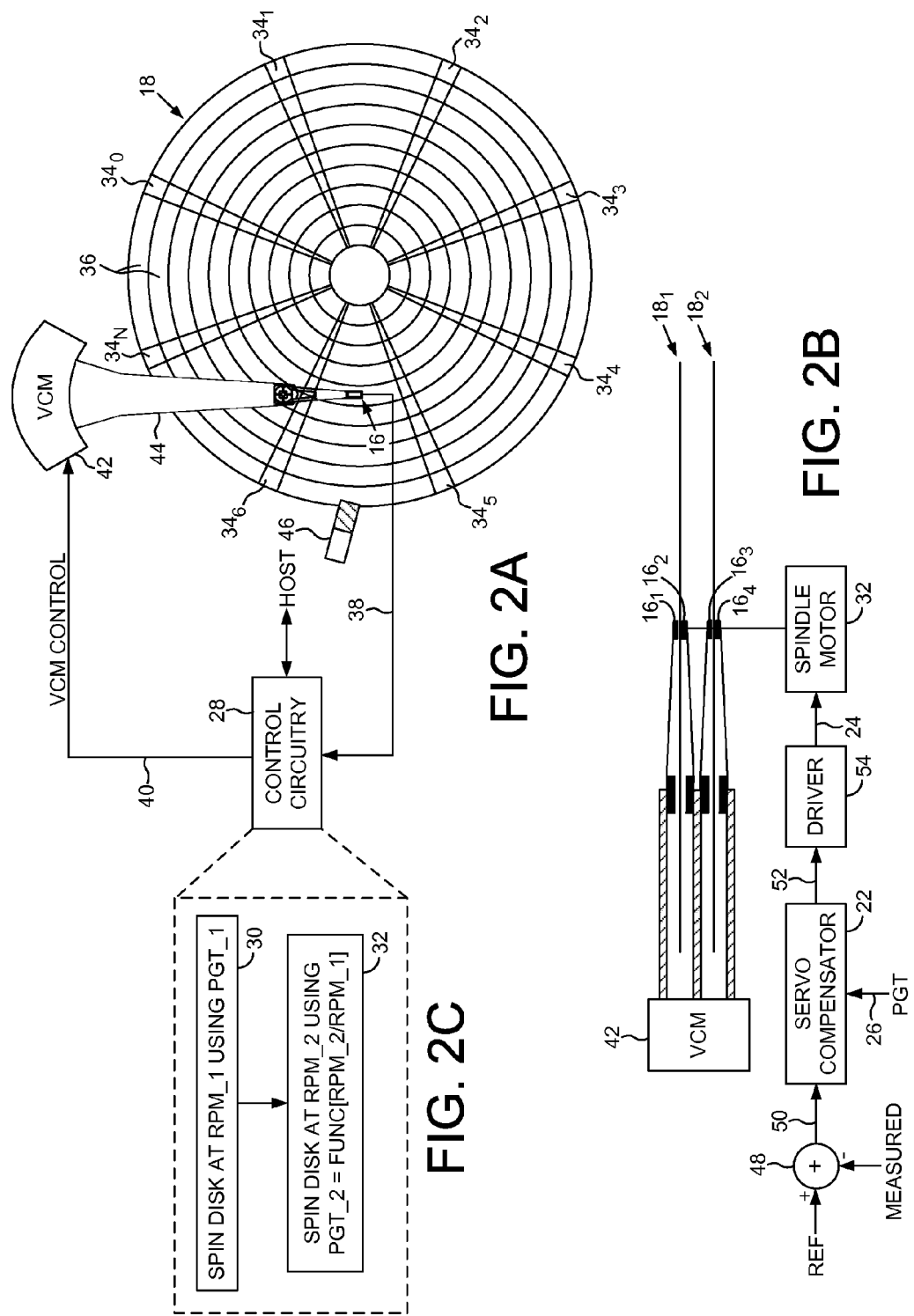

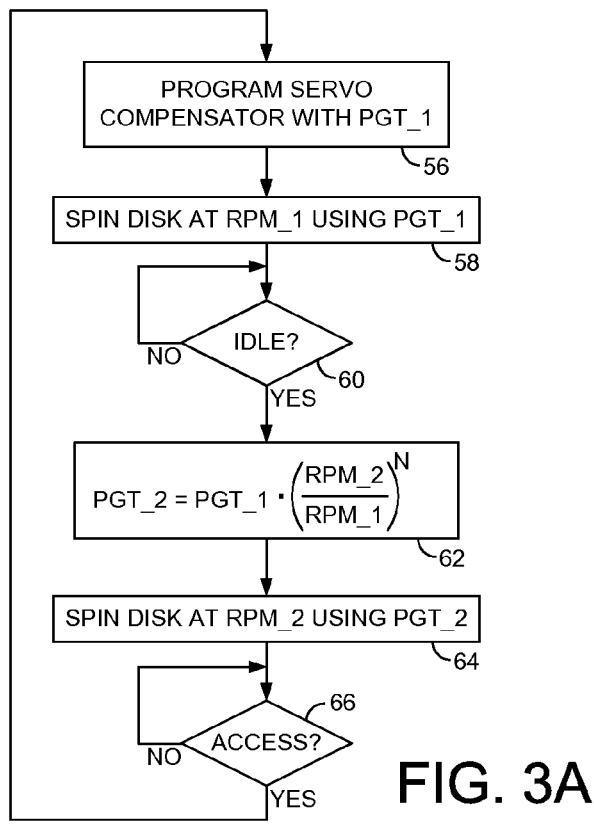

FIG. 3A $$PGT\_2 = PGT\_1 \cdot \left(\frac{RPM\_2}{RPM\_1}\right)^N \left(\frac{(RPM\_2 \cdot Ecycles \cdot Lw)^2 + \left(\frac{60 \cdot Ra}{2\pi}\right)^2}{(RPM\_1 \cdot Ecycles \cdot Lw)^2 + \left(\frac{60 \cdot Ra}{2\pi}\right)^2}\right)$$

FIG. 3B $$C1 = (Ecycles \cdot Lw)^2 \quad C2 = \left(\frac{60 \cdot Ra}{2\pi}\right)^2 \quad Ra = Rw + Rd$$

$$C3 = \frac{PGT\_1}{RPM\_1^2(RPM\_1^2 \cdot C1 + C2)}$$

$$PGT\_2 = C3 \cdot RPM\_2^2 \cdot (RPM\_2^2 \cdot C1 + C2)$$

FIG. 3C

DISK DRIVE ADJUSTING GAIN OF SPINDLE MOTOR COMPENSATOR BASED ON A RATIO OF SPIN SPEEDS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3).

The prior art disk format of FIG. 1 also comprises a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

When a disk drive is initially powered on, the disk(s) is typically spun up to an operating speed so that the data recorded on the disk may be accessed (e.g., to read boot data). If the disk drive is idle for a period of time, it may enter an idle mode to save power wherein the disk may be spun down to a lower idle speed. In addition, the disk drive may implement multiple levels of idle modes each having an increasingly slower idle speed in order to further reduce power consumption. For example, as long as the disk drive remains idle, the disk may be incrementally spun down to slower idle speeds until eventually reaching zero idle speed.

BRIEF DESCRIPTION OF THE DRAWINGS

FIGS. 2A and 2B show a disk drive according to an embodiment of the present invention comprising a head actuated over a disk rotated by a spindle motor, and a spindle motor control system comprising a servo compensator operable to generate a control signal applied to the spindle motor, the servo compensator comprising a programmable gain term (PGT).

FIG. 2C is a flow diagram according to an embodiment of the present invention wherein when the disk spin speed changes, the PGT is adjusted by scaling the current PGT by a function of a ratio of the new to current spin speed.

FIG. 3A is a flow diagram according to an embodiment of the present invention wherein the spin speed is reduced when entering an idle mode, and the PGT is adjusted by scaling the current PGT by an exponentiation of the ratio of the new to current spin speed.

FIG. 3B shows an embodiment of the present invention wherein the PGT is adjusted based on parameters of the spindle motor.

FIG. 3C shows an embodiment of the present invention for computing the new PGT using pre-computed constants.

DETAILED DESCRIPTION OF EMBODIMENTS OF THE INVENTION

Figure 1:
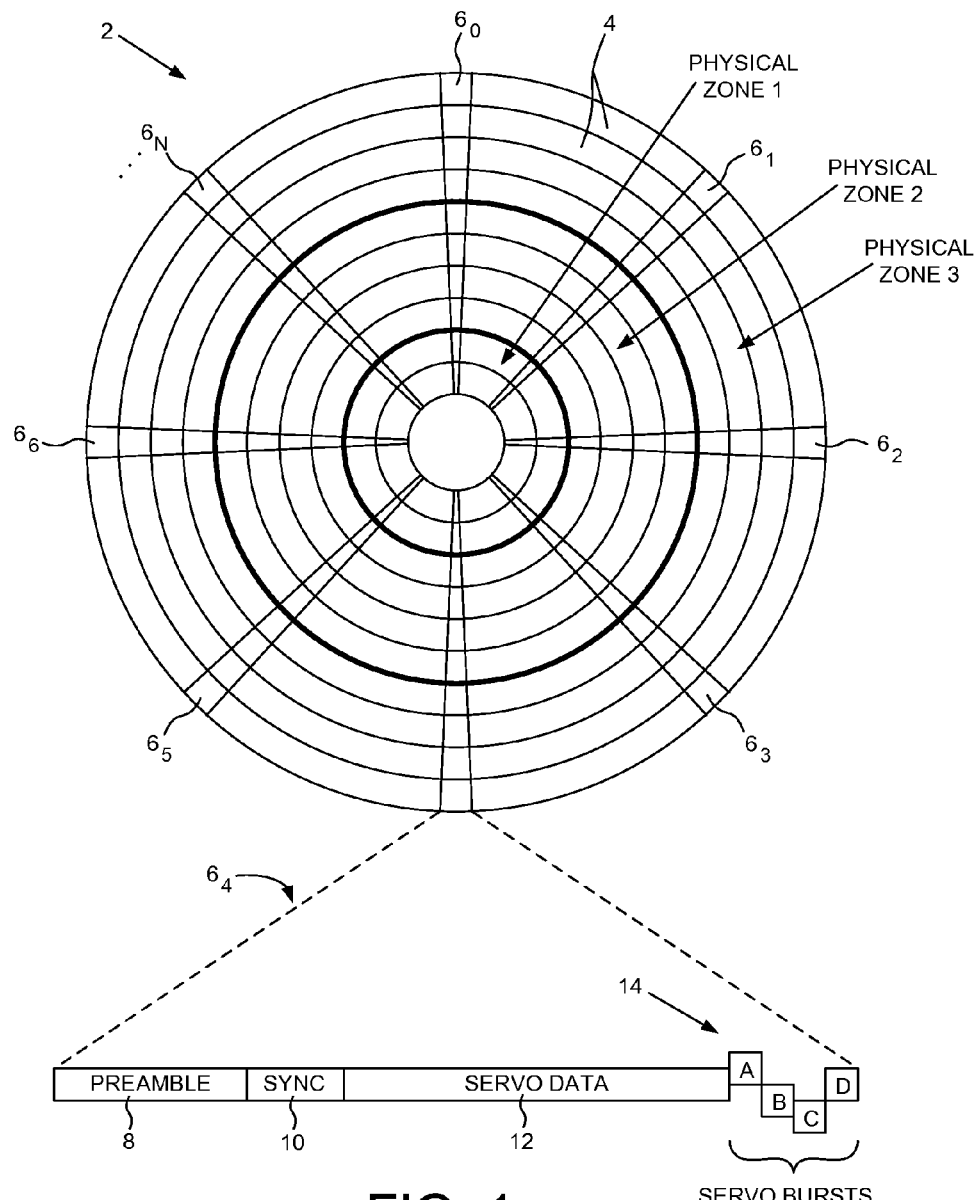
FIG. 1 shows a prior art disk format comprising a plurality of tracks defined by embedded servo sectors.

FIGS. 2A and 2B show a disk drive comprising a head 16 actuated over a disk 18, a spindle motor 20 for rotating the disk 18, and a spindle motor control system comprising a servo compensator 22 operable to generate a control signal 24 applied to the spindle motor 20, the servo compensator 22 comprising a programmable gain term (PGT) 26. The disk drive further comprises control circuitry 28 operable to execute the flow diagram of FIG. 2C, wherein the disk is spun at a first speed RPM_1 using a first value PGT_1 selected for the PGT (step 30), and the disk is spun at a second speed RPM_2 using a second value PGT_2 selected for the PGT (step 32), wherein the second value PGT_2 is generated in response to the first value PGT_1 scaled by a function of a ratio of RPM_2 to RPM_1.

The disk 18 shown in the embodiment of FIG. 2A comprises a plurality of servo sectors $34_0$-$34_N$ that define a plurality of servo tracks 36, wherein data tracks are defined relative to the servo tracks 36. The control circuitry 28 processes a read signal 38 emanating from the head 16 to demodulate the servo sectors $34_0$-$34_N$ into a position error signal (PES) representing a position error of the head relative to a target data track. The control circuitry 28 comprises a servo compensator for filtering the PES to generate a control signal 40 applied to a voice coil motor (VCM) 42 that rotates an actuator arm 44 about a pivot in order to actuate the head 16 radially over the disk 18 in a direction that reduces the PES.

When the disk is spinning at a normal operating speed, an air bearing forms between the head and the disk surface causing the head to fly above the disk surface.

When the disk drive enters an idle mode, the spin speed of the disk is reduced to save power. In one embodiment, the head may first be parked on a ramp 46 extending over the outer diameter of the disk since reducing the spin speed of the disk may reduce the air bearing. In one embodiment, the disk drive may progress through a series of idle modes wherein the spin speed may be reduced incrementally in order to incrementally reduce the power consumption. The head may remain over the disk during one or more of the idle modes, and then parked on the ramp 46 prior to reducing the spin speed beyond a predetermined threshold.

The disk drive shown in the embodiment of FIG. 2B comprises two disks $18_1$ and $18_2$ with heads $16_1$-$16_4$ actuated over respective top and bottom surfaces. The disks $18_1$ and $18_2$ are clamped to the spindle motor 20 in any suitable manner, such as clamping the disks to a hub of the spindle motor 20. In order to control the spin speed of the disks, a measured spin speed is subtracted 48 from a target reference speed, and the resulting speed error 50 is filtered by the servo compensator 22. The control signal 52 output by the servo compensator 22 is amplified by a suitable driver 54 in order to generate the control signal 24 applied to the spindle motor 20. Similar to the VCM servo loop, the spindle motor servo loop adjusts the spin speed of the spindle motor in a direction that reduces the velocity error.

The performance and stability of the spindle motor servo loop is affected by various parameters of the spindle motor and the spindle motor control system, including the value selected for the PGT 26. In one embodiment, a change in the spin speed causes a corresponding change in certain spindle motor parameters, such as the load torque and coil impedance. In order to account for the change in the spindle motor parameters when the spin speed changes, a corresponding change is made to the PGT 26 of the servo compensator 22 in order maintain the desired performance and stability in the spindle motor servo loop. In the embodiments of the present invention, the PGT 26 is adjusted in response to the current PGT value scaled by a function of a ratio of the new spin speed to the current spin speed. This enables the spin speed to be adjusted by any arbitrary amount since the PGT 26 is computed relative to the adjusted spin speed. For example, the spin speed for one or more idle modes may be tuned for a family of disk drives, or tuned for each individual production disk drive during manufacturing and/or while deployed in the field. During the tuning procedure, the PGT 26 may be recomputed for each adjustment to the spin speed.

In one embodiment, when adjusting the PGT the function of the ratio of RPM_2 to RPM_1 comprises an exponentiation of the ratio. For example, in one embodiment the function of the ratio is:

$$\left(\frac{\text{RPM\_2}}{\text{RPM\_1}}\right)^N$$

where N is greater than one. In another embodiment, the above ratio may be inverted and a negative value selected for N. In one embodiment, the second value PGT_2 is generated according to:

$$\text{PGT\_1} \cdot \left(\frac{\text{RPM\_2}}{\text{RPM\_1}}\right)^N.$$

Any suitable value may be selected for N, and in one embodiment N=2 such that the second value PGT_2 is generated according to:

$$\text{PGT\_1} \cdot \left(\frac{\text{RPM\_2}}{\text{RPM\_1}}\right)^2.$$

In another embodiment, N=3 such that the second value PGT_2 is generated according to:

$$\text{PGT\_1} \cdot \left(\frac{\text{RPM\_2}}{\text{RPM\_1}}\right)^3.$$

FIG. 3A is a flow diagram according to an embodiment of the present invention wherein the servo compensator is programmed with a first value PGT_1 selected for the PGT (step 56), and the disk is spun at a first, normal speed RPM_1 using PGT_1 (step 58). When the disk drive enters an idle mode (step 60), a second value PGT_2 is generated according to the above equation (step 62), and the disk is spun at a second, slower speed RPM_2. When the disk drive exits the idle mode (step 66), the flow diagram is repeated starting at step 56.

In another embodiment, the disk drive may decrease the spin speed in increments by entering different levels of idle mode, and then increase the spin speed incrementally by reverting to a previous idle mode level (rather than reverting to the normal operating mode as in FIG. 3A). In this embodiment, the second value PGT_2 may be generated according to the above equation wherein RPM_2 is greater than RPM_1.

In one embodiment, the exponentiation of the ratio as described above accounts for the spindle motor winding resistance, the spindle motor winding inductance, and a number of electrical cycles per mechanical cycle of the spindle motor. For example, FIG. 3B shows an embodiment wherein the second value PGT_2 is generated according to:

$$\text{PGT\_1} \cdot \left(\frac{\text{RPM\_2}}{\text{RPM\_1}}\right)^N \cdot \left(\frac{(\text{RPM\_2} \cdot Ecycles \cdot Lw)^2 + \left(\frac{60 \cdot Ra}{2\pi}\right)^2}{(\text{RPM\_1} \cdot Ecycles \cdot Lw)^2 + \left(\frac{60 \cdot Ra}{2\pi}\right)^2}\right)$$

where Ra represents a motor winding resistance of the spindle motor 20 plus a driver resistance of the spindle motor control system (resistance of driver 54 in FIG. 2B), Lw represents a spindle motor winding inductance, and Ecycles represents a number of electrical cycles per mechanical cycle of the spindle motor. FIG. 3C illustrates how the above equation can be simplified using pre-computed constants when the exponent of the ratio equals two (N=2).

Figure 4A:
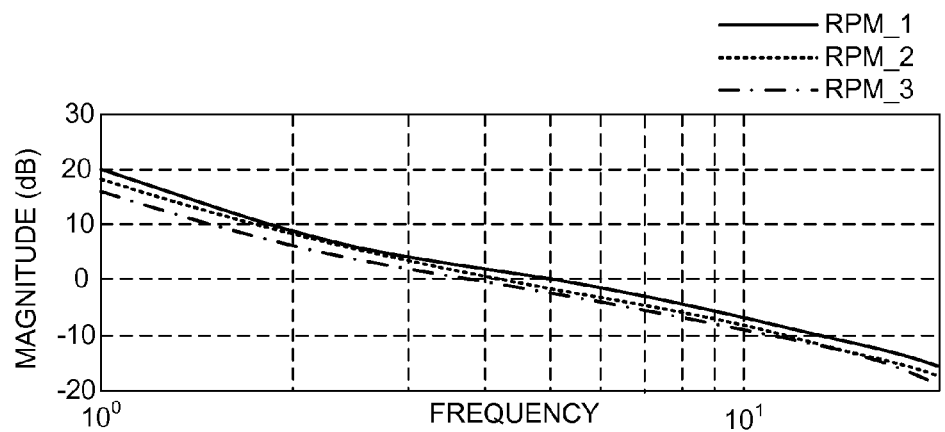
FIG. 4A shows an embodiment of the present invention wherein the function of the ratio results in a substantially constant bandwidth for the spindle motor control system across different spin speeds.
Figure 4B:
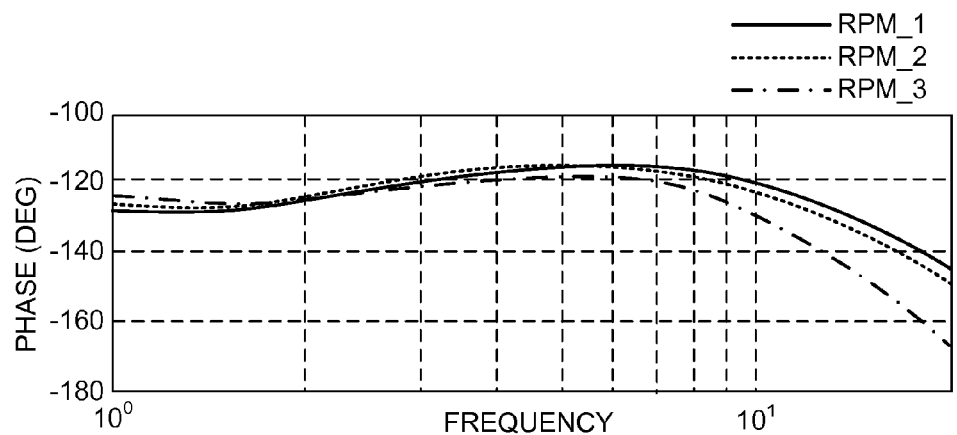
FIG. 4B shows an embodiment of the present invention wherein the function of the ratio results in a substantially constant phase response for the spindle motor control system across different spin speeds.

In one embodiment, the function of the ratio of RPM_2 to RPM_1 is selected so as to maintain a desired frequency response of the spindle motor control system over different spin speeds, thereby maintaining the desired performance and stability. For example, FIG. 4A shows an embodiment of the present invention wherein the function of the ratio results in a substantially constant bandwidth for the spindle motor control system across various spin speeds. FIG. 4B shows an embodiment of the present invention wherein the function of the ratio results in a substantially constant phase response for the spindle motor control system across various spin speeds.

In the embodiments of the present invention, when the spin speed changes the corresponding adjustment to the PGT may be made at any suitable time, such as prior to changing the spin speed, during the deceleration or acceleration phase, or after the spin speed settles to the new speed. In one embodiment, the PGT may be ramped (down or up) from the current value to the new value during the deceleration or acceleration phase.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk;
   a spindle motor for rotating the disk;
   a spindle motor control system comprising a servo compensator operable to generate a control signal applied to the spindle motor, the servo compensator comprising a programmable gain term (PGT); and
   control circuitry operable to:
      spin the disk at a first speed RPM_1 using a first value PGT_1 selected for the PGT; and
      spin the disk at a second speed RPM_2 using a second value PGT_2 selected for the PGT,
      wherein the second value PGT_2 is generated in response to the first value PGT_1 scaled by a function of a ratio of RPM_2 to RPM_1.

2. The disk drive as recited in claim 1, wherein the RPM_2 is less than the RPM_1.

3. The disk drive as recited in claim 1, wherein the function comprises an exponentiation of the ratio.

4. The disk drive as recited in claim 3, wherein the function comprises:

$$\left(\frac{RPM\_2}{RPM\_1}\right)^N$$

where N is greater than one.

5. The disk drive as recited in claim 4, wherein the second value PGT_2 is generated according to:

$$PGT\_1 \cdot \left(\frac{RPM\_2}{RPM\_1}\right)^N.$$

6. The disk drive as recited in claim 5, wherein the second value PGT_2 is generated according to:

$$PGT\_1 \cdot \left(\frac{RPM\_2}{RPM\_1}\right)^2.$$

7. The disk drive as recited in claim 5, wherein the second value PGT_2 is generated according to:

$$PGT\_1 \cdot \left(\frac{RPM\_2}{RPM\_1}\right)^3.$$

8. The disk drive as recited in claim 5, wherein the second value PGT_2 is generated according to:

$$PGT\_1 \cdot \left(\frac{RPM\_2}{RPM\_1}\right)^N \cdot \left(\frac{(RPM\_2 \cdot Ecycles \cdot Lw)^2 + \left(\frac{60 \cdot Ra}{2\pi}\right)^2}{(RPM\_1 \cdot Ecycles \cdot Lw)^2 + \left(\frac{60 \cdot Ra}{2\pi}\right)^2}\right)$$

where:
Ra represents a motor winding resistance of the spindle motor plus a driver resistance of the spindle motor control system;
Lw represents a spindle motor winding inductance; and
Ecycles represents a number of electrical cycles per mechanical cycle of the spindle motor.

9. The disk drive as recited in claim 3, wherein the exponentiation of the ratio accounts for parameters of the spindle motor.

10. The disk drive as recited in claim 9, wherein the exponentiation of the ratio accounts for the spindle motor winding resistance, the spindle motor winding inductance, and a number of electrical cycles per mechanical cycle of the spindle motor.

11. The disk drive as recited in claim 1, wherein the function of the ratio results in a substantially constant bandwidth for the spindle motor control system across the first and second speeds.

12. The disk drive as recited in claim 1, wherein the function of the ratio results in a substantially constant phase response for the spindle motor control system across the first and second speeds.

13. A method of operating a disk drive the disk drive comprising a head actuated over a disk, a spindle motor for rotating the disk, and a spindle motor control system comprising a servo compensator operable to generate a control signal applied to the spindle motor, the servo compensator comprising a programmable gain term (PGT), the method comprising:
   spinning the disk at a first speed RPM_1 using a first value PGT_1 selected for the PGT; and
   spinning the disk at a second speed RPM_2 using a second value PGT_2 selected for the PGT,
   wherein the second value PGT_2 is generated in response to the first value PGT_1 scaled by a function of a ratio of RPM_2 to RPM_1.

14. The method as recited in claim 13, wherein the RPM_2 is less than the RPM_1.

15. The method as recited in claim 13, wherein the function comprises an exponentiation of the ratio.

16. The method as recited in claim 15, wherein the function comprises:

$$\left(\frac{RPM\_2}{RPM\_1}\right)^N$$

where N is greater than one.

17. The method as recited in claim 16, wherein the second value PGT_2 is generated according to:

$$PGT\_1 \cdot \left(\frac{RPM\_2}{RPM\_1}\right)^N.$$

18. The method as recited in claim 17, wherein the second value PGT_2 is generated according to:

$$PGT\_1 \cdot \left(\frac{RPM\_2}{RPM\_1}\right)^2.$$

19. The method as recited in claim 17, wherein the second value PGT_2 is generated according to:

$$PGT\_1 \cdot \left(\frac{RPM\_2}{RPM\_1}\right)^3.$$

20. The method as recited in claim 17, wherein the second value PGT_2 is generated according to:

$$PGT\_1 \cdot \left(\frac{RPM\_2}{RPM\_1}\right)^N \cdot \left(\frac{(RPM\_2 \cdot Ecycles \cdot Lw)^2 + \left(\frac{60 \cdot Ra}{2\pi}\right)^2}{(RPM\_1 \cdot Ecycles \cdot Lw)^2 + \left(\frac{60 \cdot Ra}{2\pi}\right)^2}\right)$$

where:
Ra represents a motor winding resistance of the spindle motor plus a driver resistance of the spindle motor control system;
Lw represents a spindle motor winding inductance; and
Ecycles represents a number of electrical cycles per mechanical cycle of the spindle motor.

21. The method as recited in claim 15, wherein the exponentiation of the ratio accounts for parameters of the spindle motor.

22. The method as recited in claim 21, wherein the exponentiation of the ratio accounts for the spindle motor winding resistance, the spindle motor winding inductance, and a number of electrical cycles per mechanical cycle of the spindle motor.

23. The method recited in claim 13, wherein the function of the ratio results in a substantially constant bandwidth for the spindle motor control system across the first and second speeds.

24. The method as recited in claim 13, wherein the function of the ratio results in a substantially constant phase response for the spindle motor control system across the first and second speeds.

* * * * *